US009137014B2

(12) United States Patent
Herbach et al.

(10) Patent No.: US 9,137,014 B2
(45) Date of Patent: Sep. 15, 2015

(54) SYSTEMS AND METHODS FOR CONTROLLING ELECTRONIC DOCUMENT USE

(75) Inventors: Jonathan Herbach, Mountain View, CA (US); Dharmendra Kumar, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 519 days.

(21) Appl. No.: 13/013,282

(22) Filed: Jan. 25, 2011

(65) Prior Publication Data

US 2014/0013111 A1    Jan. 9, 2014

(51) Int. Cl.
*H04L 9/08* (2006.01)
*G06F 21/62* (2013.01)
*H04L 29/06* (2006.01)

(52) U.S. Cl.
CPC .......... *H04L 9/0866* (2013.01); *G06F 21/6209* (2013.01); *G06F 2221/2107* (2013.01); *H04L 63/102* (2013.01)

(58) Field of Classification Search
USPC ........................................................ 380/279
See application file for complete search history.

(56) References Cited

U.S. PATENT DOCUMENTS

| 5,872,849 | A * | 2/1999 | Sudia ............................. 713/175 |
| 6,314,425 | B1 * | 11/2001 | Serbinis et al. ...................... 1/1 |
| 6,449,721 | B1 | 9/2002 | Pensak et al. |
| 6,584,466 | B1 * | 6/2003 | Serbinis et al. ............... 715/209 |
| 7,174,332 | B2 * | 2/2007 | Baxter et al. .......................... 1/1 |
| 7,614,077 | B2 | 11/2009 | Brew et al. |
| 8,065,713 | B1 * | 11/2011 | Vainstein et al. ................. 726/2 |
| 8,095,790 | B2 * | 1/2012 | Takashima .................... 713/165 |
| 8,140,847 | B1 * | 3/2012 | Wu .............................. 713/175 |
| 2002/0016846 | A1 * | 2/2002 | Ono ............................. 709/229 |
| 2002/0032658 | A1 * | 3/2002 | Oki et al. ........................ 705/51 |

(Continued)

FOREIGN PATENT DOCUMENTS

JP    2001060944 A  *  3/2001
WO   WO 2006109640 A1  *  10/2006

OTHER PUBLICATIONS

Lamport, L. Password Authentication with Insecure Communication, Nov. 1981, Communications of the ACM, vol. 24, No. 11, pp. 770-772.*

(Continued)

*Primary Examiner* — Jason K. Gee
*Assistant Examiner* — Zhimei Zhu
(74) *Attorney, Agent, or Firm* — Kilpatrick Townsend & Stockton LLP

(57) ABSTRACT

One exemplary embodiment involves receiving a request for a document key for accessing a document on a client device. The request comprises a user identity identifying a requester requesting access to the document. The request also comprises information about the document. The exemplary embodiment further involves determining, at the server, whether access to the document by the requester is permitted. And, the exemplary embodiment further involves, if access to the document is permitted computing, at the server, the document key using the user identity and using the information about the document. The document key is document specific and, prior to the computing of the document key, the document key is not stored for access by the server. The exemplary embodiment further involves responding to the request by providing the document key for use in accessing the document on the client device.

20 Claims, 4 Drawing Sheets

(56) References Cited

U.S. PATENT DOCUMENTS

| | | | |
|---|---|---|---|
| 2002/0099947 A1 | 7/2002 | Evans | |
| 2003/0023559 A1* | 1/2003 | Choi et al. | 705/51 |
| 2003/0110131 A1 | 6/2003 | Alain et al. | |
| 2004/0171399 A1* | 9/2004 | Uchida et al. | 455/514 |
| 2004/0196978 A1* | 10/2004 | Godfrey et al. | 380/270 |
| 2005/0097061 A1* | 5/2005 | Shapiro et al. | 705/67 |
| 2005/0097441 A1* | 5/2005 | Herbach et al. | 715/501.1 |
| 2006/0161640 A1* | 7/2006 | Terasawa | 709/219 |
| 2006/0255123 A1 | 11/2006 | Gilfix | |
| 2007/0127719 A1* | 6/2007 | Selander et al. | 380/277 |
| 2007/0172053 A1 | 7/2007 | Poirier | |
| 2008/0130899 A1* | 6/2008 | Iwamoto et al. | 380/278 |
| 2008/0137842 A1* | 6/2008 | Everett et al. | 380/29 |
| 2008/0232598 A1* | 9/2008 | Vennelakanti et al. | 380/279 |
| 2008/0250245 A1* | 10/2008 | Sanderson et al. | 713/169 |
| 2009/0037735 A1* | 2/2009 | O'Farrell et al. | 713/170 |
| 2009/0205017 A1 | 8/2009 | Yabe | |
| 2009/0257596 A1 | 10/2009 | Piccinini et al. | |
| 2009/0307504 A1* | 12/2009 | Ishikawa et al. | 713/193 |
| 2010/0023997 A1 | 1/2010 | Hu et al. | |
| 2010/0030798 A1* | 2/2010 | Kumar et al. | 707/102 |
| 2010/0077212 A1* | 3/2010 | McReynolds et al. | 713/168 |
| 2010/0161962 A1* | 6/2010 | Lim | 713/153 |
| 2010/0185704 A1* | 7/2010 | George et al. | 707/821 |
| 2010/0235649 A1* | 9/2010 | Jeffries et al. | 713/189 |
| 2010/0262577 A1* | 10/2010 | Pulfer et al. | 707/608 |
| 2010/0293379 A1* | 11/2010 | Nie | 713/169 |
| 2011/0158405 A1* | 6/2011 | Choi et al. | 380/44 |
| 2011/0194698 A1* | 8/2011 | Asano et al. | 380/282 |
| 2011/0249816 A1* | 10/2011 | Choi et al. | 380/279 |
| 2011/0271103 A1* | 11/2011 | Shur et al. | 713/165 |
| 2011/0307706 A1* | 12/2011 | Fielder | 713/181 |
| 2012/0066744 A1* | 3/2012 | Knox | 726/4 |
| 2012/0137130 A1* | 5/2012 | Vainstein et al. | 713/165 |

OTHER PUBLICATIONS

"Paper Suppression—Use Arcot Secure Electronic Notification and Delivery Service" http://www.arcot.com/saas/electonic-notification.html downloaded from the Internet on Jan. 25, 2011.

Non Final Office Action in Related U.S. Appl. No. 13/013,368, dated Nov. 26, 2012, 19 pages.

Notice of Allowance in Related U.S. Appl. No. 13/013,368, dated Aug. 13, 2013, 13 pages.

* cited by examiner

300

```
┌─────────────────────────────────┐
│    RECEIVE A REQUEST FOR A      │
│       DOCUMENT KEY FOR          │
│     ACCESSING A DOCUMENT        │
│                          310    │
└─────────────────────────────────┘
                │
                ▼
┌─────────────────────────────────────┐
│  DETERMINE WHETHER ACCESS TO THE    │
│ DOCUMENT BY THE REQUESTER IS PERMITTED │
│                              320    │
└─────────────────────────────────────┘
                │
                ▼
┌─────────────────────────────────────┐
│ COMPUTE THE DOCUMENT KEY USING THE USER │
│ IDENTITY AND USING INFORMATION ABOUT THE │
│             DOCUMENT                │
│                              330    │
└─────────────────────────────────────┘
                │
                ▼
┌─────────────────────────────────┐
│ RESPOND TO THE REQUEST BY PROVIDING │
│       THE DOCUMENT KEY          │
│                          340    │
└─────────────────────────────────┘
```

FIGURE 3

SYSTEMS AND METHODS FOR CONTROLLING ELECTRONIC DOCUMENT USE

FIELD

This disclosure relates generally to computer software and more particularly relates to controlling the use of and access to electronic documents.

BACKGROUND

There are various techniques available to control the use of text, graphics, computer aided designs and other electronic documents. In many circumstances, it is desirable to ensure that a given document can only be used by one or more specific persons. Additional limitations on use are also often desirable. For example, a particular person's use of a document may be limited with respect to time of use such that that person can only use the document until a specified date. As another example, a person's use of a document may be limited with respect to type of use such that the person can view the document but cannot edit, copy, or print the document.

Documents are commonly encrypted to ensure that unauthorized persons cannot access the contents of the document. Distribution of the encryption keys that allow use of such encrypted documents can be controlled in various ways. Such encryption keys can, for example, be maintained at a separate network location and accessed by remote client devices when an authorized person attempts to use a document. The client device can send the person's credentials to a remote server, receive an encryption key from the remote server, and use that key to access the document. The person using the client device may be unaware of this process and may not have access to the provided encryption key. For example, the person may simply enter a username and password and the client device application may use that information to access the server, obtain the key, and open the document for the person to use. The remote server may have also provided particular policy information that defines how that person may use the document. The client device may receive this policy information and enforce the policy details, for example, by preventing the person from editing the document.

Existing servers that maintain document encryption key and policy detail information for documents require the storage and use of information about each individual document. For example, a database is used to store one or more records for each document that identifies whether a particular person has access to the document and defines the particular uses for which the person has permissions. One deficiency of such systems is that they can require a large amount of storage and communication. The storage and communication requirements can require significant resources particularly in circumstances in which the number of documents and persons is very large. As a particular example, if a service provider sends out monthly statements to hundreds of millions of customers where each such document requires a record in a database, the volume of storage and communication can be particularly burdensome.

SUMMARY

One exemplary embodiment involves receiving a request for a document key for accessing a document on a client device. The request comprises a user identity identifying a requester requesting access to the document. The request also comprises information about the document. The exemplary embodiment further involves determining, at a server, whether access to the document by the requester is permitted. And, the exemplary embodiment further involves, if access to the document is permitted computing, at the server, the document key using the user identity and using the information about the document. The document key is document specific and, prior to the computing of the document key, the document key is not stored for access by the server. The exemplary embodiment further involves responding to the request by providing the document key for use in accessing the document on the client device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 3 is a flow chart illustrating an exemplary method of controlling access to a document.

DETAILED DESCRIPTION

Improved systems and methods for controlling document use are disclosed. Document encryption keys can be used to control access to documents. In one embodiment, when a document is accessed on a client device, the client device requests the corresponding document key from a server to gain access to the document. The server responds to the request by confirming that access to the document is allowed by the requester and computing and returning an appropriate document key. The server may use the same technique for computing the document key that was used previously to compute the same document key when the document was created. Such a technique may use both stored and received information input to compute a document key. In one embodiment, a server uses a user key to compute document keys such that keys for different documents for a single user can be computed using the same user key. Such a user key may be stored for such use at a storage location accessible by the server.

A server may store only limited information for use in access determinations and document key computations. For example, rather than storing document-specific access control information and other document-specific information, a server may store more limited information that is applicable to all documents for a particular user. In one exemplary embodiment, a server stores a user key for a particular user that can be used for multiple documents for that user. As a specific example, a single user key may be used to compute document keys for electronic statement documents that are sent to a particular user each month. Document keys that are computed for different documents for a single user using such single user key may or may not differ from one another. If such document keys differ from one another, such differences can be based on information about the individual document that is retrieved from the individual documents themselves such that such additional document-specific information need not be stored or separately accessed by the server. In one embodiment, document keys can be computed to differ from one another in meaningful ways even though limited or no document-specific information is stored by the document key providing server.

These illustrative examples are given to introduce the reader to the general subject matter discussed here and are not intended to limit the scope of the disclosed concepts. The following sections describe various additional embodiments and examples with reference to the drawings in which like numerals indicate like elements.

Figure 1:
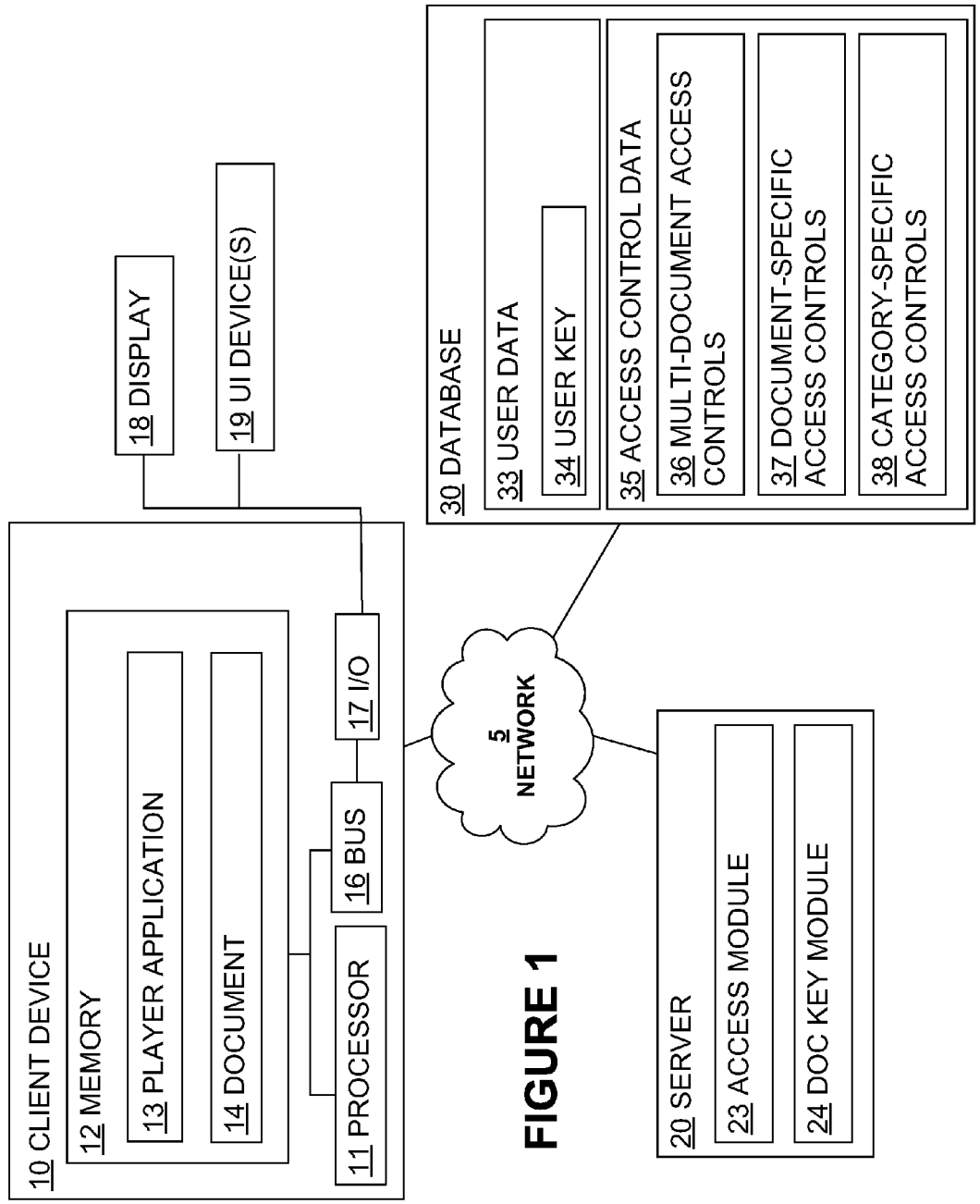
FIG. 1 is a block diagram depicting exemplary computing devices in an exemplary computing environment for implementing certain embodiments.

Referring now to the drawings, FIG. 1 is a block diagram depicting exemplary computing devices in an exemplary computing environment for implementing certain embodiments. Applications, documents, and other electronic content executes or is otherwise used on the exemplary computer devices 10, 20, 30 and are shown as functional components or modules. As is known to one of skill in the art, such applications and content may be resident in any suitable computer-readable medium and execute on any suitable processor. For example, as shown the network device 10 comprises a computer-readable medium such as a random access memory (RAM) 12 coupled to a processor 11 that executes computer-executable program instructions and/or accesses information stored in memory 12. Such a processor 11 may comprise a microprocessor, an ASIC, a state machine, or other processor, and can be any of a number of computer processors. Such a processor can comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The device 10 may also comprise a number of external or internal devices such as a mouse, a CD-ROM, DVD, a keyboard, a display, audio speakers, one or more microphones, or any other input or output devices. For example, device 10 is shown with a display 18 and various user interface devices 19. A bus, such as bus 16, is included in the device 10. Device 10 could be a personal computing device, a mobile device, or any other types of electronic devices appropriate for providing one or more of the features described herein.

As used herein the terms "document" and "electronic document" refer to any electronic content that can be displayed, executed, or otherwise used on an electronic device to provide content. A document or electronic document may comprise one or more electronic files that may be stored on and/or transferred between electronic devices. Exemplary content of a document or electronic document may comprise text, graphics, audio, video, and any other content. A document may be presented or otherwise used on an electronic device in a variety of ways.

As used herein, the term "player application" refers to any application used to play or otherwise use a document on an electronic device. A document may be played or used through various types of player applications including, but not limited to, word processing applications, audio playing applications, video playing applications, rich Internet application players, and Internet browser applications.

As used herein, the term "document key" refers to any value, identifier, or other information useable to control access to a document. A document key may or may not be used to encrypt a document such that the document key is required to decrypt the document to gain access to some or all of the content of the document.

As used herein, the term "user" refers to a person accessing, using, or attempting to access and use a document, unless otherwise expressly indicated. A person accessing, using, or attempting to access and use a document may or may not be the same person that originally secured or published the secured document.

As used herein, the term "requester" refers to a user requesting access to a document.

As used herein, the term "user key" refers to any value, identifier, or other information uniquely associated with a particular user identity, i.e., with a particular user identifier. A user identity may be associated with a particular person or a particular person's electronic account.

As used herein, the term "client device" refers to any electronic device that attempts to obtain a document or access to a document from a server device that provides the document and/or access to the document.

As used herein, the term "computing" refers to determining a value based on one or more inputs. For example, computing a document key using a user key may involve using the user key as an input to determine the document key using an algorithm, function, or other process.

As used herein, the terms "policy" and "access policy" refer to a record or other information about the rights of users with respect to accessing and using a document. An access policy can be used to determine if permission to a document can be granted and may be periodically or otherwise updated.

As used herein, the term "license" refers to an association of a policy with a particular document or documents and a user or users who may access and use that document. Thus, a policy can be applied to a particular document or documents to create a license.

As used herein, the term "document specific" refers to something being different for different documents. For example, a document specific document key is different than document keys computed for other documents. Document keys may be computed as document specific, for example, by computing document keys based at least in part on document specific information, such as information about a particular document received in a request to access that particular document.

FIG. 1 illustrates an exemplary client device 10 that comprises, in memory 12, a player application 13 and a document 14. A person using the client device 10 may desire to access the document 14 using the player application 13. For example, the person may execute the player application 13 and attempt to open the document 14 within the player application 13. However, access to the document 14 may be restricted such that the player application 13 cannot open the document without obtaining permission and/or an appropriate document key. In the exemplary computing environment of FIG. 1, such permission and/or document key may be sought by the player application 13 from server device 20, for example, by the client device 10 sending a request for permission and/or a document key to the server 20 through network 5.

The server 20 is illustratively shown as comprising an access module 23 and a document key module 24, which may reside in memory (not shown) and be executed using a processor (not shown) at the server 20. The access module 23 may respond to requests for access to documents by making one or more determinations using information in such requests. As an example, a request may request permission to allow access to a particular document by a particular user identity. The access module may make one or more determinations and access locally and/or remotely stored records to determine whether to allow such access or not. Similarly, document key module 24 may respond to requests for access to documents by computing a document key using information in such requests and/or by accessing locally and/or remotely stored records.

In the exemplary computing environment of FIG. 1, server 20 via one or both of its access module 23 and document key module 24 is able to use database 30 to provide an appropriate response to a request for access to a document from the client device 10. Database 30 is shown as illustratively comprising user data 33 that illustratively includes a user key 34. Such a user key 34 may be used, for example, to compute a document key that is used to access document 14 on client device 10. Database 30 is further shown as illustratively comprising access control data 35 that illustratively includes multi-document access controls 36. An example of one these multi-document access controls 36 is a single record providing one or more access rules applicable to multiple documents for one or more user identities. Such a single record may do so without individually identifying documents. The access control data 35 further illustratively includes document-specific access controls 37. An example of one of these document-specific access control 37 is a single record providing a restriction identifying that a particular document may not be accessed. The access control data 35 further illustratively includes category-specific access controls 38. An example of one of these category-specific access control 38 is a single record providing a restriction identifying that all documents associated with the time-frame category, July, 2010, may no longer be accessed.

These examples of access control data 35 are provided merely to illustrate examples of such data. Other types of access control data can be used to achieve these and other access control objectives. Generally, access control data may be defined in an efficient manner such that access module 23 and document key module 24 can utilize such information, possibly in combination with information otherwise known about documents, to control access to the documents in accordance with various access control objectives. Using document information that is otherwise known about a document can reduce the amount of information that needs to be stored to provide the desired access control functionality. Accordingly, the amount and/or type of information that is stored at database 30 or otherwise stored at a location accessible to server 20 can be less than it otherwise would without the use of information otherwise known about the document, e.g., without using information in the request for access to a document that identifies information about the document and/or context in which the document access is being attempted.

Figure 2:
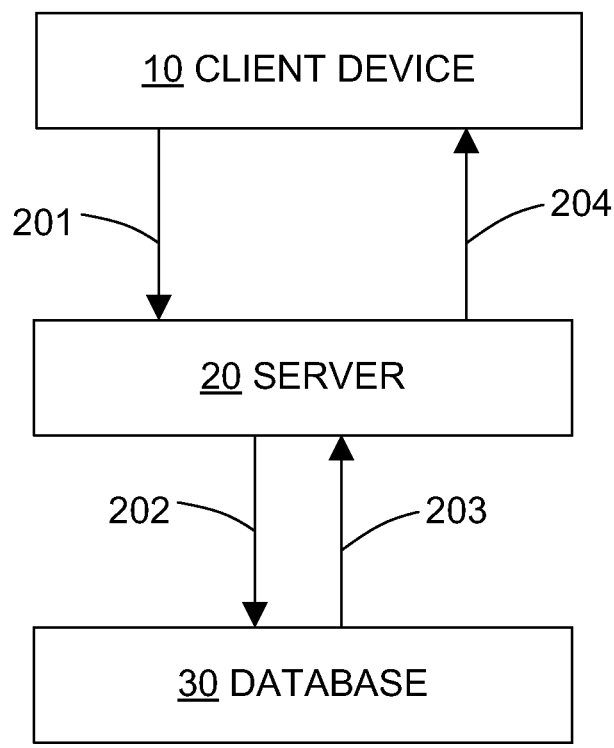
FIG. 2 is a flow chart illustrating an exemplary method of a flow of communications between electronic devices in the circumstance of a client device securing a document.

FIG. 2 is a flow chart illustrating an exemplary method of a flow of communications between electronic devices in the circumstance of a client device 10 securing a document. In this exemplary embodiment, client device 10 accesses server 20 to attempt to secure a document, such as document 14. The client device 10 initiates such a request by sending a request 201 to secure the document to the server 20. Request 201 may or may not include a copy of the document itself and may or may not include additional information. In one exemplary embodiment the request 201 identifies a person or persons that will be allowed to access the document after security has been applied to the document.

In response to receiving request 201, server 10 computes a document key for securing the document and sends a message 204 returning that document key to the client device 10 that then encrypts or otherwise secures the document using the document key. In an alternative embodiment, the request 201 includes the document and the server 20 encrypts or otherwise secures the document using a document key and returns the secured document in message 204 to the client device 10.

To compute the document key that is used to secure the document, server 20 may use information in request 201 such as information identifying a particular person or persons that will be allowed to access the document after security has been applied to the document. The server 20, for example, may identify or determine a user key using such information for each user that will be allowed to access the document. A user key may be a unique value or other information that is used in computing document keys for all documents associated with that user. Accordingly, the server 20 may create such a user key for a user if no such user key has previously been created for the user. The server 20 may access database 20 through messages 202 and 203 to determine whether a user key already exists for a particular user identity, obtain such a user key if it already exists, and/or store such a user key if it does not already exist. Accordingly, the server 20 may store user specific keys in a database 30 or other memory accessible to the server 20.

In one embodiment, the server 20 does not store the created document key since the document key can be recreated based on the stored information, and possibly additional information, to control future access to the document. Not having to store individual document keys for all documents may provide efficiency and various other advantages. Embodiments that avoid or limit storage of document-specific keys and access control information are particularly useful in contexts involving millions and even billions of documents that are created for access by a more limited number of users to individually access can particularly benefit from not having to store document access and/or document key information for each such document.

Calculation of a document key from a user key may or may not also involve the use of information about the document. For example, prior to sending a request 201 for a document key to use to encrypt or otherwise secure a document, a client device 20 may receive input for inclusion in the request 201 from a person using the client device 20 and from that input identify a particular access policy, user identity, and other information.

In one exemplary embodiment, a document is encrypted or otherwise secured such that information about the document, such as document identifying information, user identifying information, and/or license information, is accessible by the client device 10 without accessing other protected portions of the document, such as, a main portion of document content. In one exemplary embodiment, such unprotected information is stored as document metadata. In the context of later requests for access to the document, such information from the document may be used by a server 20 to compute the same document key to allow the document to be decrypted or otherwise accessed. Similarly, as another example, a statement distribution system may create monthly electronic statement documents and provide information about the document recipient that will receive the statement documents, such as a user identifier or key and/or information about various categories with which the statements are associated (e.g., month, state, account type, etc.) for use by a server 20 in computing an appropriate document key for the document.

One embodiment involves a server 20 using a user key to derive or otherwise create a document key that will differ from document to document. This is particularly useful in the context in which documents are sent uniquely to an individual consumer, for example, where individual electronic bank statements are sent each month to a particular person. In such an exemplary context, the volume of documents can be extremely high and it may be desirable to avoid the requirement of having to store, for every document, access information or other information used to provide documents keys. Thus, in one embodiment, for all documents associated with a particular user, the server 20 may only need to store access information and/or a single user key that can be used to create and recreate the document keys for the different documents.

Document keys may be provided in accordance with document access rules that are applicable to multiple documents. For example, when a request for access to a document is received, a server 20 may identify a policy that defines a user's document access rights applicable for multiple documents, e.g., generally allowing the user to access all of that user's monthly statements, without identifying individual documents. The server 20 can thus respond to such a request by confirming that access to the document is allowed without having to store or access a database that provides document-specific access rights for all individual documents. The server 20 can thus generally avoid having to store document-specific access policy information for many or all of the individual documents for which access control is provided.

While a system may utilize limited or no storage of document-specific access information and/or other information, document-specific revocations and other features may be implemented using document-specific information available from elsewhere. Such document-specific information may be available at the time the document is first secured based on user input, from the content of the document itself, and/or from the document creation environment, as examples. Such document information for a document that has already been secured may be obtained from user input, from the document itself, or from the context in which access to the document is being requested, as examples. For example, document identifying information may be available from metadata stored in a document and used to control access to the document by the server 20. In one embodiment, revocation of access rights is applied by storing some document-specific information at the server 20, such as the individual document numbers for documents for which document access has been revoked.

As another specific example in the context of electronic bank statements distributed each month for millions of users, a server 20 may selectively block access to a particular month's statement for a particular user using a particular revocation record. The server 20 may store and access a record that indicates a particular individual's monthly statement in the month of July was erroneous. When a request for the document key associated with that month is received for that user, the server 20 may identify the user and the document date information from the request itself and then may access the user's general access control record and identify that the user would generally have access to the document. However, the server 20 could also use the document date information from the request to determine that the document is the monthly statement for the month of July and then access the specific revocation record to determine that access to the particular document is not allowed. Thus, access to the document would not be allowed in accordance with the revocation.

As another specific example in the context of electronic bank statements distributed each month for millions of users, a server 20 may selectively block access to a particular month's statement for all users by including a particular revocation record that is applicable to all users such that no user can access that particular month's statement. The server 20 may store and access a record that indicates all individuals' monthly statements for the month of July were erroneous. When a request for the document key associated with that month is received, the server 20 could also use document date information from the request to determine that the document is a monthly statement for the month of July and then access the revocation record to determine that access to the particular month's document is not allowed regardless of users. In this example, a single revocation policy is applied to an entire subset of documents for all users without requiring that document-specific revocations or other records be used by the server 20 controlling such access. Another exemplary revocation use example addressed the circumstance in which a particular user key is compromised. In such a circumstance, a single revocation record can be used to revoke all of documents associated with the particular user key and/or the associated user.

In one embodiment, an open document request is received by a server 20. The server 20 authenticates the requester, extracts user identity information from a license provided in the request, verifies that the authenticated user is the same as the user associated with the license, retrieves or determines a user key, computes a document key using the user key, and sends a response that includes the document key for use in opening the document on the client device 10. A user key may comprise a unique value associated with the user identity. A user key may simply be a user identifier. Alternatively, a user key may be a value or other information accessed from a database accessible from the server 20. Policy details may also be provided to enforce any applicable use limitations of the document.

FIG. 3 is a flow chart illustrating an exemplary method 300 of controlling access to a document. Such an exemplary method is described in the context of the exemplary computing environment of FIG. 1. However, method 300 may be implemented in a variety of other computing environments, including environments that involve the use of mobile devices, environments that do not use databases, and environments that differ from the exemplary environment of FIG. 1 in various other ways. In short, the techniques and features described have a variety of uses and benefits and may be tailored, adjusted, or otherwise modified to fit the particular computing environment in which such techniques and features are implemented.

Exemplary method 300 comprises receiving a request for a document key for accessing a document on a client device 10, as shown in block 310. In one embodiment, such a request for a document key is received by a server 20 from a client device 10. The request may include various information. The request may include a user identity identifying a requester requesting access to the document. The request may include information about the document including, but not limited to, information identifying the particular document, the date the document was created, the date the document was secured, an expiration date or time period for the document, a category with which the document is associated, a license or policy with which the document is associated, among other information. In an alternative exemplary embodiment, an expiration date or time period is not retrieved from the request and, instead, is computed or otherwise determined at the server 20 based on the other document information.

A client device 10 attempting to open a document may receive authentication information as input from a person using the client device 10 and a command to open the document. The client device 10 may use this information and information from the document itself, such as the document identifier and license information obtained from an unsecured portion of the document, to send a request for a document key to a document-key-providing server 20.

Figure 4:
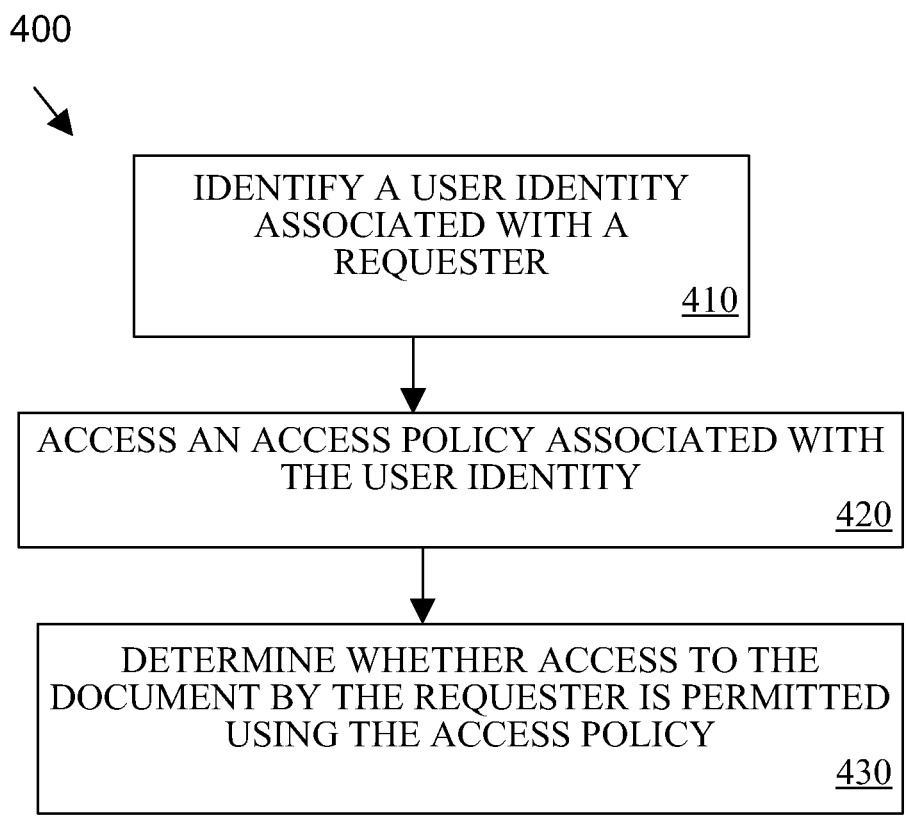
FIG. 4 is a flow chart illustrating an exemplary method of determining whether access to a document by the requester is permitted.

Exemplary method 300 further comprises determining whether access to the document by the requester is permitted, as shown in block 320. Such a determination may be performed by server 20 in response to receiving the request for the document key. FIG. 4 is a flow chart illustrating an exemplary method 400 of determining whether access to the document by the requester is permitted. The exemplary method 400 involves identifying a user identity associated with a requester, as shown in block 410. For example, server 20 may receive a request that includes a user name and password and use that information to identify the user identity associated with a requester. The exemplary method 400 involves accessing an access policy associated with the user identity, as shown in block 420, and determining whether access to the document by the requester is permitted using the access policy, as shown in block 430. For example, method 400 may involve server 20 identifying and using an access policy associated with the user identity that is retrieved from database 30. Such an access policy may be a single record that specifies access privileges applicable to one or more documents without specifying access privileges specific to individually-identified documents. For example, such an access policy may specify that the requester associated with the user identity is allowed to access all of that requester's monthly statement documents.

Determining whether access to the document by the requester is permitted using the access policy, as depicted in block 420, may involve accessing access control data that does not store individual records for every document for which access is controlled. In one embodiment, multi-document access controls 36 (FIG. 1) are used to control access such that limited or no document-specific access controls 37 (FIG. 1) are required. As a specific example, a multi-document access control may specify that a requester has access to 100 monthly statements that have been provided for the user. User identity information, rather than document identifying information, is used to determine that the multi-document access control is applicable and to determine that the requester is allowed to access any of the 100 monthly statements. If document-specific access revocations are required, the specific revocation records can be used that identify the particular document or documents that are revoked. Thus, if access to one of the 100 monthly statements is revoked, access to the monthly statements can be controlled by less than 100 access control records. As a specific example, a first record may identify that the recipient (i.e., based on the user identity) generally has access to the monthly statement. A second record can identify the revocation of access to the particular document. Thus, access to the 100 documents in this example is controlled though the use of only 2 access control records.

Returning to FIG. 3, after determining whether access to the document by the requester is permitted, the method 300 performs additional steps if access to the document is permitted. If access to the document is permitted, the method 300 computes the document key using the user identity and using information about the document, as shown in block 330. For example, if the user identity is itself a user key, such a key may be used in computing the document key. As another example, the user identity may be used to retrieve a user key from a storage location that is on or otherwise accessible. The user identify used to computer a document key need not be a user key and may alternatively comprise other types of information specific to or otherwise identifying a particular user.

The same or similar techniques used to compute the document key when applying a security policy can be used to compute the same document key when access of the document is later requested. The document key may be computed such that the document key is different than document keys determined for other documents using the same user key. Such variation can be achieved using the information about the document. For example, if such information about the document is the date the document was secured, that date can be used consistently to compute a document key for the document using the use key such that the document key for that document will always be the same. However, document keys computed for documents secured on different dates using the same user key can be computed consistently to have different document keys even though the same user key is used in the computations.

In one embodiment, a document key is created by applying a function, such as a hash function, to a user key and possible additional information. For example, a document key may be created by hashing a user key and a document identifier where the document identifier was provided by the client device 10 or otherwise. Document identifiers can be created using one or more functions to facilitate the rolling over or other periodic changing of document keys. For example, computing a document key may comprise using a function that takes as input a first value comprising the user key hashed a number of times; a document identifier; and a second value identifying the number of times. For the user identity, the number of times the user key is hashed depends upon when the document was first encrypted, such that the number of times for later encrypted documents is less than the number of times for earlier documents.

In one particular example, a DOCKEY=sh(xh(user key), document identifier, X). "X" is preferably a number of times that the hash function "xh" is applied). The "X" value can initially be very large but may be decreased over time to facilitate a periodic changing of document keys. In this example, a later key can always be used to calculate an earlier key but an earlier key cannot be used to create a later one. One possible benefit of using such a function is that a security leak that exposes an early document key does not reveal later keys. The security breach can thus be limited and addressed with little or no change to the storage and/or use of information at the server.

If access to the document is permitted, the method 300 responds to the request by providing the document key for use in accessing the document on the client device, as shown in block 340. The document key may be provided to the client device 10 from the server 20 such that the client device 10 will use the document key to access the document and then will discard the document key such that to access the document again in the future, the client device 10 will need to again request access to the document from the server 10. In one exemplary embodiment, when a server 20 is accessed by a client device 10 attempting to open a document, if the requester is authorized, the server 20 calculates a document key for opening the document and returns that document key to the client device 10. The server 20 may or may not also return policy details specifying what uses of the document are permitted for the requesting person. The client device 20 then decrypts or otherwise opens the document using the document key.

Access to one or more documents for one or more recipients may be revoked using various combinations and types of access control records. One exemplary embodiment comprises revoking document access by storing a document-specific revocation record accessible by the server 20. The document-specific revocation record can be identified by the server 20 using the information about the document in the request. For example, the request may include a document identifier that corresponds to a document record in the document-specific revocation record. Revoking document access for multiple documents may be achieved by storing a document-specific revocation record accessible by the server 20, such that the document-specific revocation record can be identified by the server 20 using the information about the document in the request. For example, information identifying that a user identity corresponds to a person that resides in California may be retrieved from a document and included in a request to access the document such that a record that identifies that multiple documents provided to any recipient resident in California, i.e., identifying that the document is associated with a California residency category, are revoked. Information about a document that is not stored in access control records can thus be used to facilitate revocation and other access control features. Such information about a document may include a category identifier, wherein a single record is stored to specify a category access rule, wherein access to each of a plurality of documents associated with the category identifier is controlled by the category access rule. As specific examples, the plurality of documents associated with the category identifier may all be associated with a particular time period or location.

As another example, information about a document that is not stored in access control records can be used to enforce document expiration constraints. Thus, a server 20 determining whether access to the document by the requester is permitted may involve determining whether access to the document has expired using an attribute identifying a date created that is identified, for example, in the information about the document provided as metadata in the document.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   sending, by a server, a plurality of documents to one or more client devices;
   receiving, at the server, a request for a document key for accessing a document of the plurality of documents on a client device, wherein the request comprises:
   a user identity identifying a requester requesting access to the document; and
   information about the document;

determining, at the server, whether access to the document is permitted or revoked;
based on determining that access to the document is permitted and is not revoked:
computing, at the server, the document key using the user identity and using the information about the document, wherein the document key is document specific, wherein, prior to the computing of the document key, the document key is not stored for access by the server, wherein computing the document key comprises using a function that takes as input: a first value comprising a user key hashed a number of times, a document identifier, and a second value identifying the number of times; and
responding to the request by providing the document key for use in accessing the document on the client device.

2. The method of claim 1 wherein determining whether access to the document by the requester is permitted comprises:
identifying, at the server, an access policy associated with the user identity, the access policy specifying access privileges applicable to one or more documents without specifying access privileges specific to individually-identified documents, wherein stored associations between user identities and access policies are accessible at the server.

3. The method of claim 1 wherein computing the document key comprises applying a function to a user key associated with the user identity.

4. The method of claim 1 wherein computing the document key comprises applying a hash function.

5. The method of claim 1 wherein the number of times the user key is hashed depends upon when the document was first encrypted, wherein the number of times for later encrypted documents is less than the number of times for earlier encrypted documents.

6. The method of claim 1 wherein determining whether access to the document is revoked comprises accessing a revocation record identified by the server using the information about the document, and wherein the revocation record is specific to the document.

7. The method of claim 1 wherein determining whether access to the document is revoked comprises accessing a revocation record identified by the server using the information about the document, wherein the revocation record indicates that access to a plurality of documents is revoked.

8. The method of claim 1 wherein the information about the document comprises a category identifier, wherein a single record is stored to specify a category access rule, wherein access to each of a plurality of documents associated with the category identifier is controlled by the category access rule.

9. The method of claim 8 wherein the plurality of documents associated with the category identifier are all associated with a particular time period or location.

10. The method of claim 1 wherein determining whether access to the document is permitted comprises determining whether access to the document has expired using an attribute identifying a date created, wherein the attribute is included in the information about the document.

11. The method of claim 1 wherein a user key is accessed from a database accessible from the server, wherein the user key comprises a unique value associated with the user identity.

12. The method of claim 1 wherein computing the document key comprises using a user key and a document identifier retrieved from the information about the document.

13. The method of claim 1 further comprising:
accessing, at the server, a first record and a second record based on the request, the first record permitting access to a plurality of documents based on information about one or more requesters, the second record revoking access to one or more documents of the plurality of documents based on a condition associated with the one or more documents;
wherein determining whether the access to the document is permitted comprises:
determining, at the server, that the first record permits access to the document based on the user identity from the request; and
wherein determining whether the access to the document is revoked comprises:
determining, at the server, that the second record does not revoke access to the document based on a comparison of the information about the document from the request to the condition.

14. The method of claim 1 wherein the document comprises a first portion and a second portion, wherein the first portion comprises the user identity and the information about the document, and wherein the second portion is protected with the document key, and wherein prior to receiving the request for the document key, the server protects the second portion of the document with the document key and sends the document to the client device, wherein protection of only the second portion of the document permits the client device to access the first portion of the document without the document key to generate the request for the document key.

15. The method of claim 1 wherein documents sent to different client devices are protected with different document keys based on different user keys, and wherein documents sent to a same client device are protected with different document keys based on a same user key and different specified periods of time associated with the documents.

16. A system comprising:
a memory that stores computer-executable instructions; and
a processor configured to access the memory and to execute the computer-executable instructions to:
send a plurality of documents to one or more client devices;
receive a request for a document key for accessing a document of the plurality of documents on a client device, wherein the request comprises:
a user identity identifying a requester requesting access to the document; and
information about the document;
determine whether access to the document is permitted or revoked;
compute the document key using the user identity and using the information about the document, wherein the document key is document specific, wherein, prior to the computing of the document key, the document key is not stored for access, wherein computing the document key comprises using a function that takes as input: a first value comprising a user key hashed a number of times, a document identifier, and a second value identifying the number of times; and
respond to the request, if access to the document is permitted and not revoked, by providing the document key for use in accessing the document on the client device.

17. The system of claim 16 wherein determining whether access to the document is permitted comprises:
identifying an access policy associated with the user account, the access policy specifying access privileges applicable to one or more documents without specifying access privileges specific to individually-identified documents, wherein stored associations between user accounts and access policies are accessible at the system.

18. The system of claim 16 wherein the number of times the user key is hashed depends upon when the document was first encrypted, wherein the number of times for later encrypted documents is less than the number of times for earlier encrypted documents.

19. The system of claim 16 wherein the information about the document comprises a category identifier, wherein a single record is stored to specify a category access rule, wherein access to each of a plurality of documents associated with the category identifier is controlled by the category access rule.

20. A non-transitory computer-readable medium comprising computer-readable instructions that, when executed on a computing device, cause the computing device to perform operations comprising:
sending, by the computing device, a plurality of documents to one or more client devices;
receiving, at the computing device, a request for a document key for accessing a document of the plurality of documents on a client device, wherein the request comprises:
a user identity identifying a requester requesting access to the document; and
information about the document;
determining, at the computing device, whether access to the document is permitted or revoked; and
based on determining that access to the document is permitted and not revoked:
computing, at the computing device, the document key using the user identity and using the information about the document, wherein the document key is document specific, wherein, prior to the computing of the document key, the document key is not stored for access by the computing device, wherein computing the document key comprises using a function that takes as input: a first value comprising a user key hashed a number of times, a document identifier, and a second value identifying the number of times; and
responding to the request by providing the document key for use in accessing the document on the client device.

* * * * *